United States Patent [19]

Stoller et al.

[11] 4,315,763
[45] Feb. 16, 1982

[54] HIGH ANALYSIS LIQUID FERTILIZERS

[75] Inventors: Jerry H. Stoller, Bunkerhill, Tex.; Harold A. Hartung, Collingswood, N.J.

[73] Assignee: Stoller Enterprises, Inc., Houston, Tex.

[21] Appl. No.: 119,429

[22] Filed: Feb. 7, 1980

Related U.S. Application Data

[63] Continuation-in-part of Ser. No. 954,733, Oct. 30, 1978, abandoned.

[51] Int. Cl.³ ............................................. C05C 9/00
[52] U.S. Cl. .................................... 71/29; 71/64.1
[58] Field of Search .................. 71/1, 11, 27, 28–30, 71/119, 64 C, 64.1; 260/555 R, 555 S, 555 C

[56] References Cited

U.S. PATENT DOCUMENTS

| | | | |
|---|---|---|---|
| 2,770,538 | 11/1956 | Vierling | 71/29 |
| 2,814,556 | 11/1957 | Christoffel | 71/29 |
| 2,855,286 | 10/1958 | Harvey | 71/29 |
| 2,869,996 | 1/1959 | Vierling | 71/29 |
| 3,022,153 | 2/1962 | Miller | 71/29 |
| 3,022,154 | 2/1962 | Potts et al. | 71/34 |
| 3,096,168 | 7/1963 | Walters | 71/28 |
| 3,234,004 | 2/1966 | Smith et al. | 71/28 |
| 3,235,370 | 2/1966 | Kealy | 71/29 |
| 3,326,666 | 6/1967 | Walters | 71/29 |
| 3,523,798 | 8/1970 | Kail | 71/29 |
| 3,527,591 | 9/1970 | Stauter | 71/28 X |
| 3,529,951 | 9/1970 | Every et al. | 71/28 |
| 3,554,730 | 1/1971 | Slaber et al. | 71/29 |
| 3,582,311 | 6/1971 | Browder et al. | 71/29 X |
| 3,640,698 | 2/1972 | Backlund | 71/29 |
| 3,649,239 | 3/1972 | Mitchell | 71/28 X |
| 3,679,390 | 7/1972 | Young | 71/29 |
| 3,713,802 | 1/1973 | Gittenait | 71/29 |
| 3,723,086 | 3/1973 | Poynor et al. | 71/29 |
| 3,918,952 | 11/1975 | Neumiller | 71/28 |
| 3,934,041 | 1/1976 | Snyder | 71/29 X |
| 3,936,501 | 2/1976 | Greidinger et al. | 260/555 R |
| 4,013,446 | 3/1977 | Beresky et al. | 71/29 X |
| 4,036,627 | 7/1977 | Funk | 71/64 C X |
| 4,116,664 | 9/1978 | Jones | 71/29 |

FOREIGN PATENT DOCUMENTS

| | | |
|---|---|---|
| 1481286 | 4/1966 | France . |
| 816573 | 7/1959 | United Kingdom . |
| 969362 | 9/1964 | United Kingdom . |
| 1149924 | 4/1969 | United Kingdom . |
| 1182395 | 2/1970 | United Kingdom . |
| 1211537 | 11/1970 | United Kingdom . |
| 1307828 | 2/1973 | United Kingdom . |
| 1310878 | 3/1973 | United Kingdom . |
| 1354784 | 5/1974 | United Kingdom . |
| 1363046 | 8/1974 | United Kingdom . |

*Primary Examiner*—S. Leon Bashore
*Assistant Examiner*—Ferris H. Lander
*Attorney, Agent, or Firm*—Kenneth H. Johnson

[57] ABSTRACT

High analysis liquid fertilizers comprising the reaction product of urea and phosphoric acid having a pH between 1.5 and 4 and optionally containing the reaction product of urea and sulfuric acid, various trace elements including those normally found as contaminants in wet process phosphoric acid, potash and gelling agents, said fertilizers being further characterized as having total analysis of N, $P_2O_5$ and $K_2O$ of at least 25 weight percent and preferably 30 weight percent or greater.

31 Claims, 3 Drawing Figures fig.1 fig.2 fig.3

HIGH ANALYSIS LIQUID FERTILIZERS

This application is a continuation-in-part of Ser. No. 954,733 filed Oct. 30, 1978, and now abandoned.

BACKGROUND OF THE INVENTION

1. Field of the Invention

The present invention relates to high-analysis low pH liquid fertilizer compositions and the methods of preparing said compositions from phosphoric acid, urea, potash and other common agricultural materials.

Modern agriculture is based on appropriate fertilization. The cost of acquiring and applying nutrients is dominant, and much effort on the part of many investigators has been directed at improving the cost-effectiveness of fertilizer systems and practices. As a result of these efforts, liquid fertilizers are growing in acceptance because of economics in appication and placement; products of higher analysis have become available, leading to cost reduction all along the line from the point of manufacture to application in the field. The present invention utilizes a novel concept to carry these favorable factors much farther than previously possible.

2. Prior Art

Much work has been done in the past on the production of high analysis liquid fertilizers. For example, U.S. Pat. Nos. 2,770,538 and 2,869,996 describe liquid products made from phosphoric acid neutralized with ammonia and potassium hydroxide, to which is added urea or ammonia plus nitric acid to furnish additional nitrogen. U.S. Pat. No. 2,814,556 shows how to combine urea, ammonia, phosphoric acid and potassium chloride to make neutral liquids of high analysis containing ammonium phosphate. U.S. Pat. No. 3,022,153 teaches the combination of urea, wet-process phosphoric acid and ammonia; stabilization with amines is required if storage periods greater than a few days are contemplated. Complexes of urea and micro-nutrient metals are described in U.S. Pat. No. 3,640,698; to these may be added moderate amounts of other nutrients to form liquid systems of low pH and low analysis. In U.S. Pat. No. 3,713,802 a process is described for reacting urea and wet process phosphoric acid, separating the precipitated urea-phosphate and ammoniating it to convert it into commercially useful grades of liquid or solid fertilizer; in this process, separation of the urea-phosphate by precipitation and filtration is required to remove contaminants present in the phosphoric acid. Similarly, U.S. Pat. No. 3,723,086 discloses reacting merchant grade wet process phosphoric acid and urea followed by ammoniation to produce liquid fertilizers. U.S. Pat. No. 3,918,952 uses potassium chloride, urea and ammonium polyphosphate to make high analysis liquids; in these products, potassium chloride is the only form of potash compatible with the other ingredients, and relatively expensive polyphosphates must be used.

Generally in the prior art, high analysis liquids are achieved by using expensive furnace grade phosphoric acid, or by removing contaminants from the cheaper wet process phosphoric acid by costly processing, or by converting orthophosphoric acid to polyphosphoric acid by heat treatment. The products are usually neutralized to pH values ranging from 6 to 8.7 for stability and achievement of the required analysis, with some exceptions as noted above (U.S. Pat. No. 3,640,698) in which only low concentrations of total primary nutrients (N+P+K below 25%) can be realized. The field of the present invention is low pH fertilizers of high total nutrient content (25% or more, reaching values of 50% or more). These products are clear liquids, or suspensions when K exceeds the limit of solubility, made from conventional commercial materials.

In the present invention, urea is used as the source of nitrogen and phosphoric acid as the source of phosphorous. The reaction of urea and phosphoric acid to produce urea phosphate is known. As recognized in the art, this reaction is the equimolecular reaction of urea and phosphoric acid to produce a coordination-type complex by the equation:

$$CO(NH_2)_2 + H_3PO_4 = CO(NH_2)_2 \cdot H_3PO_4$$

Dilute aqueous solutions of urea phosphate have been described; see, for example, U.S. Pat. No. 4,013,446. The limit of solubility of this material in water at 25° C. is 90 parts per 100 parts of water by weight, giving a solution containing 7% nitrogen and 17% phosphorous pentoxide; at 0° C., the solubility and assay are appreciably lower. Solutions of higher concentration crystallize; this fact is used in British patent specification No. 1,149,924 to make solid urea phosphate. In the present work, stable liquid fertilizers are produced that are far more concentrated than the former references, without the crystallization of solid urea phosphate described by the latter.

Urea is also reacted with sulfuric acid to make certain fertilizer grades as shown in U.S. Pat. No. 4,116,664. In these cases, urea reacts with sulfuric acid to form urea sulfate, a known compound and liquified urea.

Liquid fertilizers provide opportunities for further savings in several key areas including:

1. Production of higher analysis compounds
2. Use of lowest cost components
3. Provision of formulating flexibility so that the desired precise nutrient ratios can be made from a minimum number of simple components
4. Simplification of the compounding process and equipment so that it can be moved as close as possible to the point of application
5. Incorporation of trace and secondary elements from low-cost inorganic sources
6. Maximizing agronomic efficiency, especially with regard to retention and utilization of nitrogen in the soil and phosphate availability.

All of these elements have been addressed in the current invention, and what results is a novel method of producing novel liquid fertilizers.

It is an advantage of the present invention that liquid fertilizers having high total nutrient content according to commercial standards may be prepared. It is a further advantage of the invention that these liquid fertilizers are prepared autothermally, without recourse an external heating. The term "autothermally" is used herein to indicate an exothermic reaction. It is a feature of the present invention that the liquid fertilizers may be prepared from a limited number of components. It is a particular feature that the liquid fertilizers may be manufactured in simple equipment that is readily available and low in cost, using straight-forward precedures that can be easily mastered by compounders. It is a further feature of the present invention that the liquid fertilizers may be made quickly. It is a particular advantage of the present process that commercial grades of components may be satisfactorily employed to produce the fertilizers.

It is a further advantage that the liquid fertilizers of this invention exhibit commercially acceptable stability over the full range of nutrient content. In addition, it is a particular advantage that the present invention allows inclusion of secondary and trace elements in stable and available form without prior-art chelated or complexed products.

One of the features of the present invention is the preparation of a complete range of fluid fertilizers containing combinations of the primary nutrients, nitrogen, phosphorus and potassium, wherein N may range up to 30 weight percent, $P_2O_5$ up to 50 weight percent and $K_2O$ up to 30 weight percent.

A further most important feature of the present invention is to provide fertilizers of improved agronomic efficiency, in which nitrogen and phosphate availability are maximized.

The first feature of the products of this invention that contributes to improved agronomic efficiency is the lowering of soil pH locally, which substantially improves the availability and mobility of metallic trace elements. This effect is well known; it has been used in the past to increase trace element availability, but not in the form of this invention, employing acid fertilizers.

A second factor of unique importance in the enhancement of agronomic efficiency is the protective effect of acid on the mobility of phosphate ions in the soil. In many instances, calcium ions are present in the soil in a form and to a degree that lead to the formation of insoluble calcium phosphate. This is substantially phosphate rock, similar to that from which the phosphate was originally freed by the action of sulfuric acid. Acid in the formulations of this invention will achieve the same effect, rendering the phosphate ions free and available.

A third element in the improvement of agronomic efficiency relates to the retention of nitrogen in the soil. The loss of nitrogen as ammonia to the atmosphere is a well-known phenomenon in agriculture, and one of the advantages of urea over ammonia is that this loss is greatly reduced. However, urea is converted to ammonia by decomposition in the soil in an essential first step toward ultimate utilization by plants; in this process, ammonia will still be lost to the atmosphere. The acid fertilizers of this invention delay and reduce this loss by at least two mechanisms. First, the hydrolysis of urea and conversion to ammonia is slowed by the fact that it is present as an acid reaction product. Beyond this, the acid environment created by the use of the products of this invention provides sites to which ammonia is strongly attached as soon as it is formed; as a result, the loss of ammonia into the atmosphere is substantially reduced. This is a factor of considerable agronomic significance.

SUMMARY OF THE INVENTION

Basically, the present invention concerns high analysis liquid fertilizers comprising the reaction product of urea and phosphoric acid, having a pH less than 4, preferably less than 2 and generally from about 1.5 to 2.0. Specifically the liquid fertilizers are the reaction product of urea and phosphoric acid or a mixture of phosphoric and sulfuric acid, have a pH of less than 4; and are clear liquids. Potash may be incorporated in these liquids, giving clear liquids which have an analysis of N, $P_2O_5$ and $K_2O$ totaling at least 25 weight percent of the fertilizer in the ranges of greater than 0 to 30 wt. % N, preferably about 0.1 to 30 wt. % N; 5 to 50 wt. % $P_2O_5$ when the usual 75% phosphoric acid (54% $P_2O_5$) is used, and 0 to 12 wt. % $K_2O$. The liquid compositions of the present invention may be further characterized as having total N, $P_2O_5$ and $K_2O$ analysis of at least 25 weight % and preferably greater than 30 weight % of the fertilizer. It should be appreciated that only N and $P_2O_5$ may be present in some compositions and that the total analysis characterizing the composition is based on these two components, $K_2O$ being 0 and the N being greater than 0. The compositions of the present invention are clear liquids, stable against crystallizing at 0° C. That is, the liquid compositions of the present invention do not salt out at 0° C. Generally, up to 2 moles of urea per mole of 75% phosphoric acid may be employed without dilution water. When sulfuric acid is present in addition to phosphoric, up to about 3 moles of urea may be added (depending on the amount of sulfuric acid present, since up to 3 moles of urea will combine with concentrated (93%) sulfuric acid alone to form 0° C. stable liquids). The amount of urea used is that required to obtain the mole ratio or analysis desired; e.g., if one mole of urea per mole of 75% $H_3PO_4$ is used, the product contains 14.7% N, 37% $P_2O_5$ and 0% $K_2O$ (14.7-37-0). For grades of commercial significance, usually at least one mole of urea per mole of acid, e.g., phosphoric acid, would be used.

The process of the present invention for preparing high analysis, liquid fertilizer composition consists essentially of:

(1) admixing:
   urea and phosphoric acid in a mole ratio of about 0.1 mole up to about 2 moles of urea per mole of acid present or
   urea and a mixture of phosphoric acid and from 5 to 80 weight percent sulfuric acid based on said phosphoric acid in a mole ratio of about 0.1 mole up to about 3 moles of urea per mole of acid present,
(2) reacting said urea and said acid exothermally and without external heating, and
(3) recovering a liquid product having a total of N, $P_2O_5$ and $K_2O$ analysis of at least 25 weight % of said product.

This invention is particularly well adapted to the utilization of commercial grades of phosphoric acid and/or urea. The acids are frequently contaminated with trace metals for example, iron, which can be a useful component of the fertilizer. However, in the liquid fertilizers presently in wide use, these trace elements precipitate out of solution because the liquids are neutral or basic in nature. The liquid fertilizers of the present invention are highly acidic non-ammoniated liquid fertilizers, rendering trace elements more soluble.

This benefit applies not only to those trace metals which occur naturally in the phosphoric acid, but also to metal salts which may be added to the finished fertilizer such as zinc, manganese, aluminum or iron sulfates or chlorides.

Agricultural potash, potassium chloride, (other potassium salts such as potassium carbonate may be used also) is soluble in reasonable proportions, i.e., up to about 20 weight percent in water at 0° C.; however, the so-called super concentrations of potash are obtained by suspending the potash beyond its solubility limits in a finely divided form with the aid of gelling materials (viscosifying agents) such as clays (montmorillonite, benotonite) heteropolysaccharides, natural gums and the like. The gelling material is present in a viscosifying amount sufficient to suspend finely divided solid particles, e.g., 50 to 1000 microns. When this is done, suspensions containing 50% of combined nutrients can readily be made, with ranges of 5 to 15% N, 5 to 25% $P_2O_5$ and 12 to 30% $K_2O$ by weight.

The reaction of phosphoric acid and urea is exothermic; however, it proceeds at a rather slow rate. This reaction rate can be increased and sulfur can be added to the fertilizer composition by employing mixtures of phosphoric acid and sulfuric acid; preferably from 5 up to about 80 weight percent of the total acid content may be sulfuric acid, more preferably up to about 50 weight percent.

The reaction of urea and phosphoric acid may be conducted in dilute aqueous solutions; in fact this method has been used in the prior art, as noted above in British patent specification No. 1,149,924. However, use of water solutions is detrimental to the salt out stability of the system and of course, the presence of water in the fertilizer compositions reduces the nutrient content. In the present invention, some water will normally be present in phosphoric acid (10–15% usually), some as a result of the hygroscopic nature of urea (0–5%), and some water (up to 40% of the weight of urea) may be added as a processing aid to slurry the urea and expedite the contact of urea and the acid; the amount of water present during the reaction between urea and phosphoric acid is thus limited. This limitation increases the total nutrient content of the fertilizer compositions of this invention, and, as will be seen below, is a factor in their stability. Further, this limitation of water is in stark contrast to the prior art cited above, in which urea is reacted as a solution in water.

It is unexpectedly found that, while many of the compositions of this invention contain urea phosphate in concentrations that should crystallize at low temperature according to prior art, they do not do so. This is believed to be due in part to the presence of other components in the complete formulation; for example, sulfuric acid, potassium chloride and contaminants occurring in wet process phosphoric acid have been found in this work to reduce the tendency of urea phosphate crystals to form and grow. Another and probably greater effect is the method of manufacture, in which the reaction between urea and phosphoric acid is conducted at moderate temperatures. Finally urea enters the system as a solid or at most a heavy slurry, with far less water than is required to solublize it. The water present, if any in the present compositions is less than that required to form aqueous solutions of the reaction products. Thus, water is not the solvent for the present liquid compositions, although water may be present as described above, i.e., as a contaminant or processing aid. Among these influences, it is found that urea phosphate does not crystallize from these compositions even though they far exceed the normal solubility of the urea phosphate.

In all the prior art relating to urea-phosphoric acid combinations, one or more of these conditions prevails:
1. The system is neutralized, usually with ammonia, so that urea phosphate does not exist, the urea being displaced by ammonia.
2. Urea is decomposed to form ammonia, which serves to neutralize the phosphoric acid.
3. Urea phosphate is formed, crystallized and separated from the reaction mixture.
4. Urea phosphate is formed in dilute enough solution so that it remains dissolved.

We are not here concerned with neutralized solutions (which cannot contain urea phosphate at any rate), nor with solutions dilute enough to remain dissolved (less than 25% combined N+$P_2O_5$ calculated on a $K_2O$ free basis). The object of this invention is to make urea phosphate in a concentrated acid system and to keep it in stable solution, a problem to which no prior art has been addressed.

To prevent the crystallization of urea phosphate from concentrated acid solutions, the reaction should be conducted at the lowest temperature consistent with acceptable reaction rate (100° F. or less). If sulfuric acid is used in the formula, temperature can be allowed to rise substantially (up to 180° F.); as little as 10–20% sulfuric acid in the formula will prevent urea phosphate crystallization completely. Limiting the water content of the system as explained above, in combination with low temperature reaction, further inhibits crystallization; if a particular formula calls for additional water (as with compositions high in $K_2O$) sulfuric acid is again useful to prevent crystal formation. An additional variable is the source of the phosphoric acid; furnace grade acid forms crystals more readily than wet process acids, probably because the latter contain less water, some free sulfuric acid, or other contaminants (these acids differ among themselves, as is shown later). With due attention given these factors, any acid formation within the limits given below, above 25% combined nutrient (N+$P_2O_5$+$K_2O$) can be made as a stable liquid.

The term "stable against salting out at 0° C. means that substantially no precipitation of materials occurs in the liquid fertilizers at 0° C.

The "viscosifying amount" means that amount of a material, i.e., a viscosifying agent which will increase the viscosity of liquid in question to a degree sufficient to achieve the desired result, i.e., suspend fine insoluble particles.

DETAILED DESCRIPTION OF THE INVENTION AND EXAMPLES

The reaction between reagent grade urea and food grade phosphoric acid, 75% can be conducted to give products of analysis up to 22-28-0 (N-P-K). This is accomplished without added water, by simply stirring the mixture of urea and acid. Heating is mild, the solutions are viscous and the reactions slow, requiring up to several hours in small batches to reach completion at high N values. If it is desired to increase the ratio of N to P, maintaining good low temperature stability, it is found this can only be done by reducing the P level by dilution. If water is used as the diluent, the result is as shown on FIG. 1, where it can be seen that actual N concentration falls as the system is diluted.

In the process of preparing these compositions, it has been found that where the ratio of nitrogen to $P_2O_5$ by weight is 0.6:1 or greater, the phosphoric acid should advantageously be added directly to the urea. Preferably, the urea has been dampened or slurried with water prior to acid addition. However, where the weight ratio of nitrogen to $P_2O_5$ is less than 0.6:1, the urea may be added directly to the phosphoric acid. This weight ratio corresponds to a mole ratio of urea to phosphoric acid of 1.5.

The procedure of adding the phosphoric acid to the urea when the weight ratio of N:P$_2$O$_5$ is 0.6:1 or greater avoids crystallization or salting out that would normally result. (Note U.S. Pat. No. 3,713,802, cols. 4 and 5).

Figure 2:
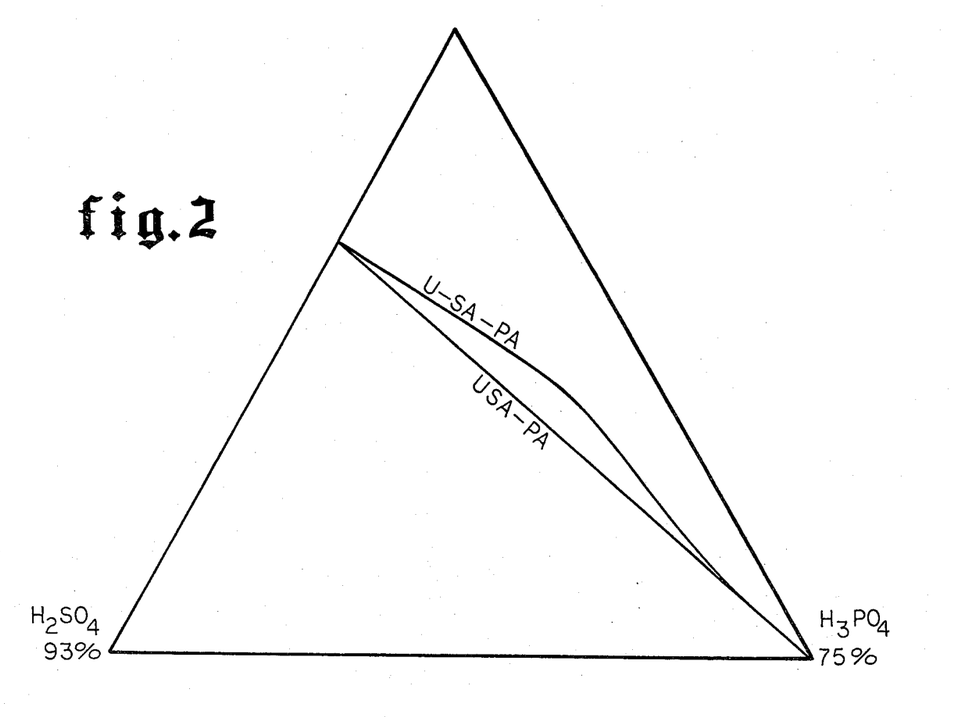
FIG. 2 is a ternary graph of 0° C. stable urea-sulfuric acid-phosphoric acid compositions.

N-P solutions with sulfur can be made by blending urea-sulfuric acid (USA) with phosphoric acid (PA). These solutions are completely miscible in all proportions, and of good stability if kept covered to exclude atmospheric moisture pick-up. No heating is observed in mixing, but since both liquids are viscous, some agitation is required to produce a uniform blend. In FIG. 2, the line marked "USA-PA" gives the compositions available by this technique.

Because of the high intensity of the urea-sulfuric acid reaction, special procedures are needed to make the concentrated product on a commercial basis. If the desired product requires acid of 50% concentration or less, the urea can be slowly added to the acid with stirring. If however, the acid is stronger than this, decomposition may result if this procedure is followed. In these cases, it is desirable to add the acid slowly to the urea while tumbling; after a fraction of the acid (20-30%, depending on concentration) has been added, a stirrable slurry is formed. Slow addition of the remainder of the acid while stirring brings the system to complete reaction.

Once a batch of liquid product has been made, it can be used as a base for further manufacture. This is done by placing the liquid in a stirred vessel of appropriate size, adding urea in sufficient quantity to double the size of the finished batch, adding any water required for the formulation, and slowly adding the sulfuric acid while stirring. Leaving a heel of liquid in the vessel permits further manufacture to be conducted in a stirred fluid mass.

N-P solutions with sulfur can also be made by combining urea, sulfuric acid and phosphoric acid directly. To do this, the two acids are measured, combined and mixed; some heat generation accompanies this operation. The urea is then added, with stirring; here the heat release is appreciable, depending on the proportion of sulfuric acid in the mix (higher sulfuric acid content generating more heat). Reaction is rather rapid, generally being complete in 15-20 minutes, again depending somewhat on the proportion of sulfuric acid present. By this method it is possible to combine more urea and phosphoric acid in the product with a given amount of sulfuric acid than can be done by blending phosphoric with pre-reacted urea-sulfuric acid. FIG. 2, line "U-SA-PA" shows the results that can be achieved by this method.

Turning now to the use of field grade materials in the preparation of these compounds, certain limitations arise due to the condition of the urea and/or the composition of the phosphoric acid.

Field grade phosphoric acid generally contains some free sulfuric acid, some dissolved or suspended metal salts, and some organic residues or carbon. Table I gives analysis of some field grade materials. While Food Grade acid of the same strength is water-white, with a specific gravity of 1.574 and a viscosity less than 100 cp at 70° F., field acids are highly colored (green, brown or black), with specific gravities ranging from about 1.65 to 1.95 and viscosities are high as 1000 cp. The high values of viscosity and specific gravity indicate the presence of metal salts and sulfuric acid, with correspondingly reduced water content. As a consequence of these compositional variations, some difference in behavior must be expected when making compounds described above using field acids.

TABLE I

| Constituent | Composition of Commercial Phosphoric Acids, Wt. % | | | | |
|---|---|---|---|---|---|
| | A | B | C | D | E |
| P$_2$O$_5$ | 54.8 | 53.4 | 52.8 | 53.4 | 52.1 |
| Ca | 0.01 | 0.1 | 0.05 | 0.1 | 0.03 |
| Fe | 0.7 | 0.8 | 0.7 | 1.2 | 0.5 |
| Al | 0.7 | 0.3 | 0.4 | 0.6 | 0.6 |
| Mg | 0.3 | 0.2 | 0.3 | 0.3 | 0.2 |
| Cr | 0.03 | 0.01 | 0.01 | 0.01 | 0.04 |
| V | 0.04 | 0.01 | 0.01 | 0.02 | 0.04 |
| Na | 0.03 | 1.9 | 0.04 | 0.2 | 0.1 |
| K | 0.07 | 0.1 | 0.03 | 0.01 | 0.1 |
| F | 0.7 | 0.3 | 0.4 | 0.9 | 0.5 |
| SO$_3$ | 3.0 | 1.8 | 2.8 | 1.5 | 2.2 |
| SiO$_2$ | 0.2 | 0.2 | 0.2 | 0.1 | 0.1 |
| C | 0.1 | 0.04 | 0.8 | 0.2 | 0.04 |
| Solids* | 1.7 | 5.1 | 8.3 | 2.9 | 0.5 |

*Filtered, dried 1 hour @220F
Source: Encyclopedia of Chemical Technology, 2nd Ed., Vol. 9, p. 88

Another feature of these field grade acids that will be relevant to their performance in making the fertilizer compounds described is the slow precipitation of a complex iron-aluminum-potassium phosphate. This compound forms continuously until the component in shortest supply is virtually depleted; this is usually potassium. Consequently, when potassium (in the form, say, of potassium chloride solution) is added to such an acid with modest amounts of iron and/or aluminum still present in the acid, further precipitation of the complex salt occurs. The salt, (Fe, Al)$_3$ KH$_{14}$(PO$_4$)$_8$ · 4H$_2$O, has about the same phosphate content as the remainder of the acid, so no effect on the assay is noticeable due to the modest amount of insoluble material which might settle out.

In any field situation, it must be presumed that some carbamate is present in the urea; in fact, some carbamate is probably present in most urea as it is supplied.

In storage, however, further hydrolysis of the urea may occur, particularly under warm wet conditions to produce ammonium carbonate, ammonia and carbon dioxide; as a result field grade urea is likely to be appreciably different from reagent grade product.

The degradation of urea can be catalyzed by certain metal salts, notably some of these occurring in field grade phosphoric acids. In such cases, carbon dioxide is given off and solid ammonium phosphate is formed. This type of degradation is accelerated by high temperature and low pH.

Figure 1:
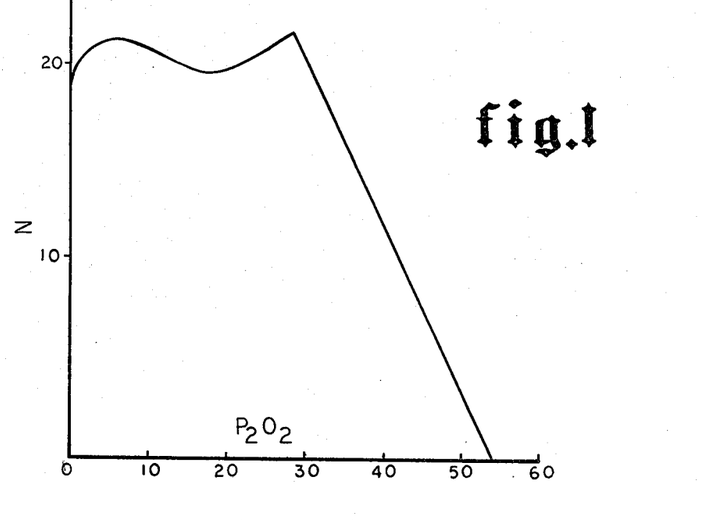
FIG. 1 is a binary graph of 0° C. stable urea-phosphoric acid composition.

It is consequently found that with field grade materials it is not generally possible to reproduce FIG. 1, although with urea in good condition and certain acids (including furnace grades) the compounds described can be made. Best results with field materials have come with the use of sulfuric acid, phosphoric acid and urea as described above and shown in FIG. 2 (line U-SA-PA). Using this method, it is possible to prepare the compositions shown in FIG. 2 with a wide variety of field acids.

Highest assays and best stability in storage are achieved when the urea is in good condition, that is, when it has undergone little or no hydrolysis. With such urea and a variety of field grade acids, a broad range of N-P-S compositions represented by FIG. 2 (line U-SA- PA) are readily made as shown in Table II which is extracted from FIG. 2.

TABLE II

| Blend | N-P solutions with S made with field components | | | | | | |
|---|---|---|---|---|---|---|---|
| | Wt. % | | | Wt. % | | | |
| | U | PA | SA | N | P | K | S |
| 1 | 17.5 | 74.5 | 8 | 8 | 40 | 0 | 2.5 |
| 2 | 22 | 69 | 9 | 10 | 37 | 0 | 2.8 |
| 3 | 26 | 64 | 10 | 12 | 34 | 0 | 3.1 |
| 4 | 30 | 59 | 11 | 14 | 31 | 0 | 3.4 |
| 5 | 35 | 53 | 12 | 16 | 28 | 0 | 3.7 |
| 6 | 39 | 48 | 13 | 18 | 26 | 0 | 4.0 |
| 7 | 43.5 | 41.5 | 15 | 20 | 22 | 0 | 4.6 |
| 8 | 48 | 33.5 | 18.5 | 22 | 18 | 0 | 5.7 |
| 9 | 53 | 24 | 23 | 24 | 13 | 0 | 7.1 |
| 10 | 57 | 17 | 26 | 26 | 9 | 0 | 8.0 |

U - Urea
PA - phosphoric acid
SA - sulfuric acid

The N-P liquids described above and illustrated in FIG. 1 and FIG. 2 can be augmented with K to make full N-P-K liquids. One method of producing these materials is to prepare a KCl solution and blend it with the N-P liquid of choice. It is found, when laboratory materials are used, that for the most part the liquids blend arithmetically; that is, if two liquids of 0° C. stability are blended in any proportion, the blend will have the same stability. In some regions of composition, somewhat more K can be introduced. This behavior is shown in FIG. 3, where any composition within the envelope curve can be made; the ends of this curve show the slightly anomalous behavior referred to above.

Figure 3:
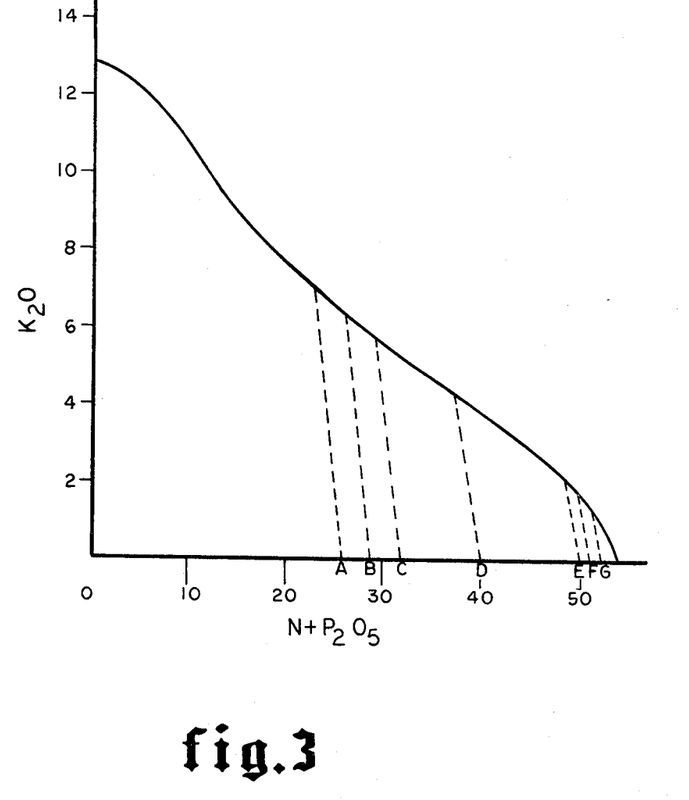
FIG. 3 is a graph showing 0° C. stable urea-phosphoric acid-$K_2O$ compositions.

FIG. 3 represents the compositions shown in FIG. 1 along the abscissa. Compositions between 54 and 50% combined N and P are those shown in the right-hand portion of FIG. 1; below 50% N+P on FIG. 3 the N-P on FIG. 3 the N-P blends contain water and follow the compositions shown in the left-hand portion of FIG. 1.

A number of these compositions can be made with field grade acids; occasionally an acid is encountered which does not permit making the higher analysis compounds on or near the envelope curve. In most cases, such acids can be used for lower grades. Generally, if the N-P solution can be made with a field acid, so can the appropriate N-P-K solution. One problem that arises with field grade acids is the potash reaction mentioned above, which causes sedimentation. This effect may not rule out the use of a given acid, however, because it does not reach serious proportions immediately and there would normally be time to apply such a mixture; further, the sediment is relatively insoluble in the solution, but would slowly dissolve in the soil solution, so its nutrient value would not be lost. With furnace grade acids this type of reaction does not occur.

To use FIG. 3, select the ratio of N to P, desired, and locate along the abscissa the total N-P content permissible where:

| Point | N/$P_2O_5$ |
|---|---|
| A | 5 |
| B | 3 |
| C | 2 |
| D | 1 |
| E* | 0.786 |
| F | 0.5 |

-continued

| Point | N/$P_2O_5$ |
|---|---|
| G | 0.2 |

*points to the left of line E require water.

* points to the left of line E require water.

From this value and the ratio, the composition of the base N-P solution (urea, phosphoric acid and water if indicated) can be found. Blend in solid potash to reach any point along the tie line, within the envelope curve. If a higher potash content is needed, with the same N-P ratio, the solution can be blended with KCl solution, generally following the envelope up and to the left; this procedure dilutes the total nutrient content, but maintains the N-P ratio.

If it is desired to increase the potash level beyond the limit of solubility, suspensions must be made. These are prepared from the acid fertilizer base containing the other desired nutrients according to procedures well known to those in the art. The acid fertilizer liquids of this invention make excellent suspensions of very high total analysis, and the thickeners of viscosifying agents conventionally used in suspension fertilizer technology with neutral compositions are all effective with these acid materials.

The following examples illustrate that claimed as the invention; however, they should not be viewed as restricting the scope of the claims to which the inventor is otherwise entitled. The liquid fertilizers are analyzed and the analysis reported with three or four numbers. The numbers (weight percent) represent the components (N-$P_2O_5$-$K_2O$-S).

EXAMPLE 1

To 630 grams of 75% furnace phosphoric acid (Food Grade) 370 grams of urea was added with moderate stirring. Mild heat evolution occurred, and the solution of the urea was complete in 15 minutes. The product was a fluid water-white material of pH 1.5. stable to storage at 0° C. Analysis of the product was 17-34-0.

EXAMPLE 2

435 grams of urea was wetted with 194 grams of water; with brief mild stirring the urea disintegrated into a slurry. To this slurry was added, with moderate stirring, 371 grams of wet process phosphoric acid, 54% $P_2O_5$. Mild warming occurred, and solution was complete in 15 minutes. The product was fluid, clear and stable at 0° C. It analyzed 20-20-0. This material was miscible in all proportions with phosphoric acid to give lower nitrogen-phosphate ratios, such as 10-37-0, 5-45.5-0, etc.

EXAMPLE 3

Sulfuric acid (66 Be) and wet process phosphoric acid (0-54-0) were mixed in the proportions 80 to 745 grams, respectively. The mixture was stirred, exhibiting mild warming. While stirring, warm, 175 grams of urea was added. Solution was complete within ten minutes. The product was a clear, stable, viscous liquid, with pH of 1.7; it analyzed 8-40-0-2.5S.

EXAMPLE 4

260 grams of sulfuric acid (66 Be) was mixed with 170 grams of wet process phosphoric acid, 54% $P_2O_5$. To the stirred mixture 570 grams of urea was added. Solution was effected rapidly, within five minutes, giving a clear, stable fluid analyzing 26-9-0-8S.

EXAMPLE 5

407 grams of urea and 65 grams of potash (potassium chloride) were wetted with 182 grams of water to disintegrate the urea and form a heavy slurry. This was stirred slowly for a few minutes to complete the action, and 346 grams of wet process phosphoric acid, 54% $P_2O_5$, was added. After stirring for 15 minutes the solution was clear, fluid and free of undissolved material. It stored well at low temperatures, down to −7° C., for extended periods; at room temperatures of 24°–27° C. some crystals of potash started to appear after two weeks. Analysis of this product was 18.7-18.7-4.

EXAMPLE 6

The product of Example 5 was mixed with additional wet process phosphoric acid in the ratio of 591 grams to 409 grams. With very mild stirring the mixture was completed in a few minutes to give a clear, fluid stable product analyzing 11-33-2.4. It was found that other ratios, such as 13.9-27.8-3, 9.2-36.8-2 and 7.8-39-1.7 could be made with equal ease.

EXAMPLE 7

To 249 grams of water was added 97 grams of potash with good stirring. The solution becomes very cold and the potash normally dissolves very slowly; however, after a few minutes of agitation 267 grams of wet process phosphoric acid was added. The heat of dilution of the acid aided the solution of the potash, and within a few minutes it was in solution. 387 grams of the product of Example 5 was then added, and stirring was continued for ten minutes. The resulting solution was fluid and stable, analyzing 7.2-21.6-6.

EXAMPLE 8

653 grams of urea was placed in a beaker and moistened with 20 grams of water while slowly stirring. To this mass was added 327 grams of commercial 66 Be sulfuric acid in the following manner: Acid was added slowly with slow agitation until approximately 15% of the addition was completed. At this point the mass had liquified into a mixable slurry, and the speed of agitation was increased to a mild level. Slow addition of acid was continued until all the acid was incorporated into the mass. Stirring was continued for a few minutes, then stopped while the material cooled and entrained air escaped. The product was a viscous, water-white liquid analyzing 30-0-0-10S, with a pH of 1.5; on dilution with water no heat was evolved.

EXAMPLE 9

A mixture was made of 445 grams of the product of Example 5 with 555 grams of the product of Example 8. Simple stirring of the two viscous liquid for a few minutes was sufficient to effect complete solution. The resulting fluid fertilizer analyzed 25-8.3-1.8-5.5S.

EXAMPLE 10

A suspension fertilizer was made by pre-gelling 15 grams of attapulgite with 120 grams of wet process phosphoric acid. To this was added 308 grams of urea-sulfuric acid, the product of Example 8; following this addition, 65 grams of wet process phosphoric acid was incorporated. Potash in the amount of 492 grams was then blended into the mixture. The resulting suspension analyzed 9-10-30-3S.

EXAMPLE 11

A mixture of 306 grams of the product of Example 8 and 278 grams of wet process phosphoric acid was made by thorough mixing for a few minutes. Into this mixture was incorporated 6 grams of Xanthan gum with thorough mixing for 10 minutes, until gellation began to occur. At this point 410 grams of potash was blended in, and mixing continued for an additional 10 minutes. The fluid suspension thus prepared analyzed 9-15-25-3S.

EXAMPLE 12

To illustrate the effect of low pH fertilizers on soil, four soils, ranging in character from sandy through fine sandy loam to clay loam, were treated with a solution of urea in water. Duplicate samples of each soil were also treated with the reaction product of urea and sulfuric acid, the product of Example 8. In each case, the level of nitrogen added to the soil was 280 mg. The soil samples were so arranged that nitrogen lost from the surface to the atmosphere as ammonia was continuously collected and monitored. The results of these experiments are tabulated below, giving loss measurements made at 72 and 168 hours.

| Soil | Type | pH | Treatment | Nitrogen Loss From Surface, Mg. | |
|---|---|---|---|---|---|
| | | | | 72 hrs. | 168 hrs. |
| A | Clay Loam | 6.85 | Urea/water | 10 | 93 |
| | | | Urea/acid | 2.5 | 10 |
| B | Sand | 5.1 | Urea/water | 163 | 275 |
| | | | Urea/acid | 4 | 4 |
| C | Clay Loam | 4.95 | Urea/water | 30 | 81 |
| | | | Urea/acid | 0 | 7 |
| D | Fine Sandy Loam | 5.2 | Urea/water | 121 | 200 |
| | | | Urea/acid | 1 | 2.5 |

Note that from urea/water the nitrogen losses in one week are a very large part of the material added.

The decompositions of urea and loss of ammonia to the atmosphere is greatly delayed and reduced in soils of agricultural significance by acid compositions such as those according to this invention. The importance of this property of the products of this invention is very substantial.

EXAMPLE 13

The improved compatibility of trace metal salts with the acid fertilizers of this invention was demonstrated by adding zinc sulfate (36% zinc) to several complete fertilizers.

Fertilizer A: Conventional 10-34-0, neutral, processed under conditions which produce large amounts of polyphosphoric acid which is reputed to have good compatibility with metals; this is why the more expensive processing is done.

Fertilizer B: Ortho 10-34-0, neutral, the same composition as above but cold processed so that no poly acid is formed.

Fertilizer C: Acid 24-12-0-4S, a high nitrogen acid grade according to the present invention, that in a neutral product would present great difficulty with trace metals.

To each of the above was added 2% by weight % zinc sulfate with good stirring to assume uniform mixing:

| Fertilizer | Observation |
|---|---|
| A | An estimated 50% of the added material settled out as sticky lumps that would plug screens. |
| B | All the material precipitated and settled to the bottom. |
| C | A light uniform haze developed which did not settle; the small fraction of the zinc not in solution would be uniformly applied without equipment problems. |

The superiority of the acid formula in the mix tank is apparent. This effect carries along after application as well. Similar results are obtained with manganese sulfate, another common source of a trace metal.

EXAMPLE 14

This example shows the advantage of low temperature processing under autothermal conditions in preventing the crystallization of urea phosphate from concentrated solutions. Two different phosphoric acids were used, both 54% $P_2O_5$: furnace grade (water white, sp gr 1.57, fluid) and a wet process grade (green sp gr 1.95, very viscous). These two grades represent extremes, and all acids encountered in the field would be between them in compositions.

Each acid was reacted with urea in a mole ratio of 1:1 (31.5 g. urea added to 68.5 g acid), stirred to completion (10 minutes) under the temperature conditions given below, and observed.

| Acid | Temperature | Observation |
|---|---|---|
| A. Furnace | 75° F. (autothermal) | No crystals (1 yr. +) |
| B. Furnace | 125° F. (external heat) | Crystals in 1 hr, stirred |
| C. Furnace | 200° F. (external heat) | Crystals in 20 min. stirred |
| D. Wet Process | 140° F. (autothermal) | No crystals (1 yr. +) |
| E. Wet Process | 175° F. (external heat) | Crystals in 2 days |
| F. Wet Process | 200° F. (external heat) | Crystals in 1 day |

These results clearly show the advantage of autothermal processing in preventing crystallization. They also illustrate the range of conditions likely to be encountered in practice. Finally, they demonstrate that it is possible to overcome the natural tendency of these concentrated solutions to crystallize, upon which prior art is based.

EXAMPLE 15

The two phosphoric acids used in Example 14 were reacted autothermally with urea in different mole ratios:

| Acid | Mole Urea Ratio Acid | Composition | Observation |
|---|---|---|---|
| A. Furnace | 2 | 22-28-0 | No crystals (1 yr. +) |
| B. Furnace | 1 | 14.7-37-0 | No crystals (1 yr. +) |
| C. Furnace | ½ | 8.6-44-0 | Fine crystals, 1 hr. stir |
| D. Wet Process | 2 | 22-25-0 | No crystal, (1 yr. +) |
| E. Wet Process | 1 | 14.7-37-0 | No crystals (1 yr. +) |
| F. Wet Process | ½ | 8.6-44-0 | No crystals (1 yr. +) |

These results show that the useful range of ratio of urea to acid can successfully be covered with wet process acid. They also indicate that an area of potential concern with very clean acid exists in the low urea portion of the spectrum, and that additional steps may be necessary to prevent crystallization in this region with such acids as standing materials (see Example 16).

EXAMPLE 16

In this example, the deleterious effect of excessive water and the beneficial effect of sulfuric acid in preventing crystallization are illustrated.

I. Sample A from Example 14 was mixed with an equal weight of 20% potassium chloride solution. Within a few minutes fine crystals of urea phosphate began to form. Sulfuric acid (6% by weight) added to the solution dissolved the crystals and prevented their reappearance.

II. Sample D from Example 14 was mixed with potassium chloride solution as above. No crystallization occurred.

III. Samples B and C from Example 14, after crystallization, were each treated with sulfuric acid. In both cases, 15% sulfuric acid by weight dissolved the crystals already present and prevented them from forming again.

IV. Sample C from Example 15, after crystallization, was treated with 15% by weight of sulfuric acid. Crystals were dissolved and did not reform.

These results show that in the absence of other stabilizing influences, water encourages the crystallization of urea phosphate. Sulfuric acid, on the other hand, inhibits crystal formation.

The invention claimed is:

1. A high analysis, non-ammoniated, liquid fertilizer which is the reaction product of urea and phosphoric acid or a mixture of phosphoric acid and sulfuric acid, and characterized as a clear liquid, which does not salt out at 0° C., has a pH of less than 4 and has an analysis of N and $P_2O_5$ and $K_2O$ totaling at least 25 weight percent of the fertilizer in the ranges of >0 to 30 wt. % N, 5 to 50 wt. % $P_2O_5$ and 0 to 12 wt. % $K_2O$.

2. The high analysis, liquid fertilizer according to claim 1 wherein the reaction product is that of urea and phosphoric acid.

3. The high analysis, liquid fertilizer according to claim 1 wherein the reaction product is that of urea and a mixture of phosphoric acid and sulfuric acid.

4. The high analysis, liquid fertilizer according to claims 1, 2 or 3 wherein the total N, $P_2O_5$ and $K_2O$ analysis is at least 30 weight % of the fertilizer.

5. The high analysis liquid fertilizer according to claim 1 having a pH in the range of 1.5 to 4.

6. The fertilizer composition according to claim 5 wherein said pH is less than 2.

7. The fertilizer composition according to claim 1 where a potassium-containing component is present.

8. The fertilizer composition according to claim 7 wherein potassium chloride is present.

9. The fertilizer composition according to claim 1 wherein a viscosifying amount of gelling material is additionally present for suspending finely divided solid particles.

10. The fertilizer composition according to claim 9 wherein potassium chloride is present in excess of its solubility in said composition, as a finely divided solid.

11. The fertilizer composition according to claim 1 containing trace metals.

12. The fertilizer composition according to claim 11 wherein the trace metals include one or more of the metals zinc, manganese, aluminum or iron.

13. A process for preparing high analysis, non-ammoniated, liquid fertilizer composition consisting essentially of:
   (1) admixing:
      urea and wet process field grade phosphoric acid in a mole ratio of about 0.5 mole up to about 2 moles of urea per mole of acid present or
      urea and a mixture of phosphoric acid and from 5 to 80 weight percent sulfuric acid based on said phosphoric acid in a mole ratio of about 0.1 mole up to about 3 moles to urea per mole of acid present
   (2) reacting said urea and said acid exothermally and without external heating in the presence of less water than required to form aqueous solutions of the reaction products, and
   (3) recovering a liquid product having a total of N, $P_2O_5$ and $K_2O$ analysis of at least 25 weight % of said product.

14. The process according to claim 13 wherein potassium is added as soluble salt.

15. The process according to claims 13 and 14 wherein additional urea and sufficient water to solubilize said urea is added thereto.

16. The process according to claim 13 for preparing a high analysis, liquid fertilizer composition containing nitrogen and phosphorus in a weight ratio of N:$P_2O_5$ of 0.6 or more:1 consisting of adding said phosphoric acid to urea, mixing said materials, allowing said phosphoric acid and urea to react.

17. The process according to claims 13 or 16 wherein said urea is dampened or slurried with water prior to acid addition.

18. The process according to claim 13 for preparing a high analysis, liquid fertilizer composition containing nitrogen, phosphorus and sulfur comprising admixing said phosphoric acid with 5 to 80% of its weight of sulfuric acid, adding urea thereto, mixing said materials, and allowing said acids and urea to react.

19. The process according to claim 18 wherein at least 1 mole of urea per mole of acid is present.

20. The process according to claim 13 for preparing a high analysis, liquid fertilizer composition containing nitrogen and phosphorus comprising admixing urea and said phosphoric acid.

21. The process according to claim 20 wherein at least 1 mole of urea per mole of acid is present.

22. The process according to claim 13 wherein said phosphoric acid is wet process field grade phosphoric acid having a $P_2O_5$ analysis of about 52.1 to about 54.8 wt. %.

23. The process according to claim 13 wherein a viscosifying agent is added to said liquid product and a solid particulate potassium compound, which is normally soluble in said liquid product is added thereto in excess of the solubility of said potassium compound.

24. A high analysis, non-ammoniated, liquid fertilizer which is the reaction product of urea and phosphoric acid or a mixture of phosphoric acid and sulfuric acid, and characterized as a clear, liquid which does not salt out at 0° C., has a pH of less than 4 and has an analysis of N and $P_2O_5$ and $K_2O$ totaling at least 25 weight percent of the fertilizer in the ranges of >0 to 30 wt. % N, 5 to 50 wt. % $P_2O_5$ and 0 to 12 wt. % $K_2O$, prepared by the process consisting essentially of:
   (1) admixing:
      urea and wet process field grade phosphoric acid in a mole ratio of about 0.5 mole up to about 2 moles of urea per mole of acid present or
      urea and a mixture of phosphoric acid and from 5 to 80 weight percent sulfuric acid based on said phosphoric acid in a mole ratio of about 0.1 mole up to about 3 moles of urea per mole of acid present
   (2) reacting said urea and said acid exothermally and without external heating in the presence of less water than required to form aqueous solutions of the reaction products, and
   (3) recovering a liquid product having a total of N, $P_2O_5$ and $K_2O$ analysis of at least 25 weight % of said product.

25. A fertilizer according to claim 24 containing nitrogen and phosphorus in a weight ratio of N:$P_2O_5$ of 0.6 or more:1 consisting of adding said phosphoric acid to urea, mixing said materials, allowing said phosphoric acid and urea to react.

26. The fertilizer according to claim 24 containing nitrogen, phosporus and sulfur comprising admixing said phosphoric acid with 5 to 80% of its weight of sulfuric acid, adding urea thereto, mixing said materials, and allowing said acids and urea to react.

27. The fertilizer according to claim 24 wherein said urea is dampened or slurried with water prior to acid addition.

28. The fertilizer according to claim 24, 25, 26 or 27 wherein at least 1 mole of urea per mole of acid is present.

29. The high analysis, liquid fertilizer according to claim 1 wherein N is 8.6 to 22 wt. % and $P_2O_5$ is 25 to 44 wt. %.

30. A process for preparing high analysis, non-ammoniated, liquid fertilizer composition consisting essentially of:
   (1) admixing:
      2 urea and wet process phosphoric acid in a mole ratio of at least about 1 mole up to about 2 moles of urea per mole of acid present or
      urea and a mixture of phosphoric acid and from 5 to 80 weight percent sulfuric acid based on said phosphoric acid in a mole ratio of about 0.1 mole up to about 3 moles to urea per mole of acid present
   (2) reacting said urea and said acid exothermally and without external heating in the presence of less water than required to form aqueous solutions of the reaction products, and
   (3) recovering a liquid product having a total of N, $P_2O_5$ and $K_2O$ analysis of at least 25 weight % of said product.

31. The process according to claim 13 for preparing a high analysis, liquid fertilizer composition wherein said phosphoric acid is wet process furnace grade phosphoric acid.

* * * * *